S. F. WEBB.
LINE AND CORNER FENCE POST AND BRACER.
APPLICATION FILED APR. 26, 1909.
966,969.
Patented Aug. 9, 1910.
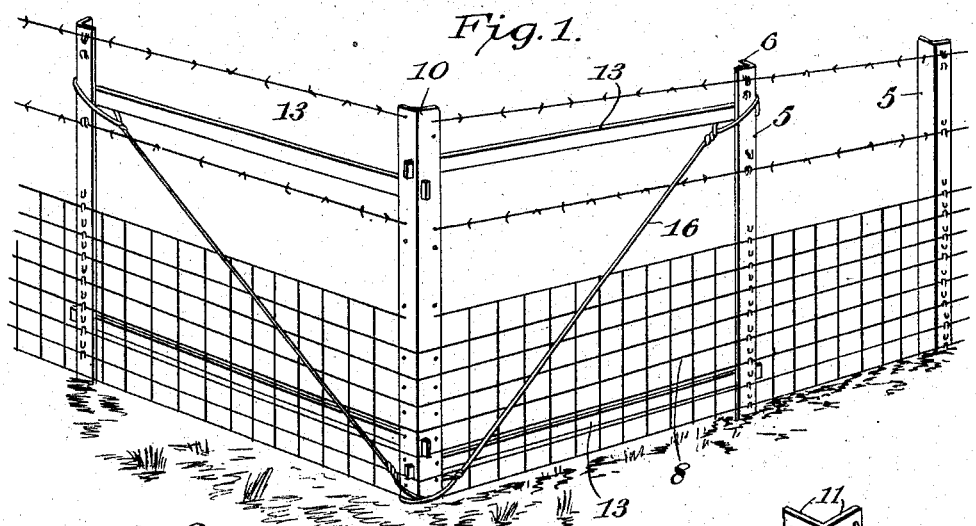
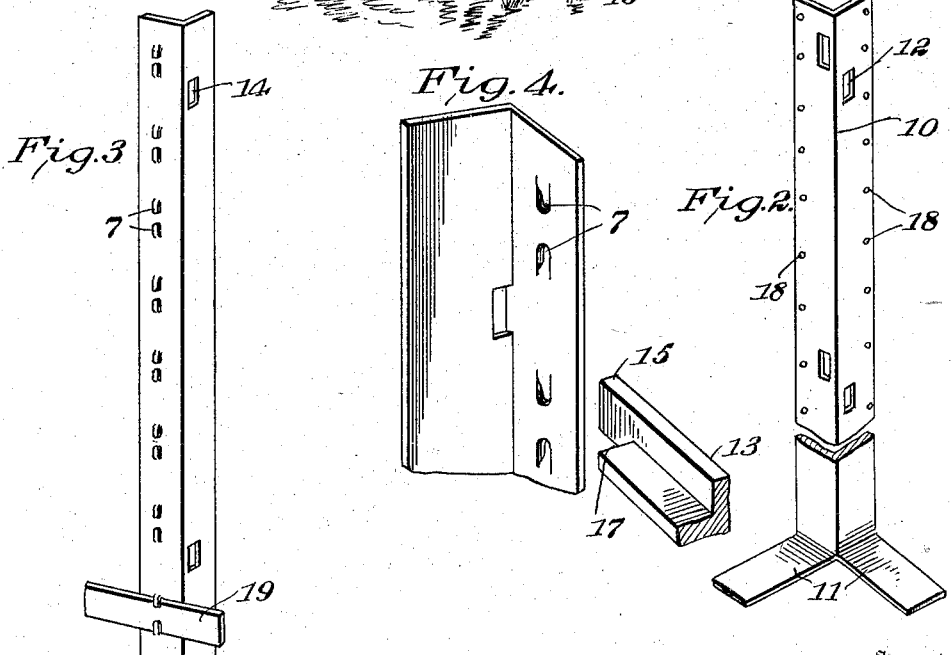
Inventor
S. F. Webb,

UNITED STATES PATENT OFFICE.

SAMUEL F. WEBB, OF WICHITA, KANSAS.

LINE AND CORNER FENCE POST AND BRACER.

966,969.  Specification of Letters Patent.  Patented Aug. 9, 1910.

Application filed April 26, 1909. Serial No. 492,275.

*To all whom it may concern:*

Be it known that I, SAMUEL F. WEBB, citizen of the United States, residing at Wichita, in the county of Sedgwick and State of Kansas, have invented certain new and useful Improvements in Line and Corner Fence Posts and Bracers, of which the following is a specification.

This invention relates to fence posts and has for its object the provision of a strong, durable and thoroughly efficient device of this character for supporting longitudinal wires in a line of fencing.

A further object of the invention is to provide a corner post having intersecting braces secured thereto and adapted to engage the adjacent line posts thereby to reinforce and strengthen the corners of the fence and prevent sagging of the line wires.

A futher object of the invention is generally to improve this class of devices so as to increase their utility, durability and efficiency, as well as to reduce the cost of manufacture.

Further objects and advantages will appear in the following description, it being understood that various changes in form, proportions, and minor details of construction may be resorted to within the scope of the appended claims.

For a full understanding of the invention, reference is to be had to the following description and accompanying drawings, in which:

Figure 1 is a perspective view of a portion of a wire fence provided with line and corner posts constructed in accordance with my invention; Fig. 2 is a perspective view of the corner post detached; Fig. 3 is a similar view of one of the line posts; Fig. 4 is a detail perspective view of the upper portion of one of the line posts, a portion of one of the transverse braces being shown in position to enter the opening in said line post.

Corresponding and like parts are referred to in the following description, and indicated in all the views of the accompanying drawings, by the same reference character.

The wire fence forming the subject matter of this invention includes a plurality of line posts 5 driven or otherwise embedded in the ground at predetermined intervals and preferably formed of angle iron, the flanges 6 of which are disposed at right angles to each other as shown.

The metal forming one of the flanges of each line post is formed with a plurality of upstruck tongues or clips 7 preferably arranged in pairs and adapted to receive and clamp the adjacent longitudinal wires 8. The lower ends of the line post 5 are also formed with anchoring devices 9 which serve to prevent the withdrawal of the post after the latter has been driven into the ground. The corner post 10 is also preferably formed of angle irons and is split longitudinally at its lower end to produce laterally extending anchoring flanges 11 there being vertically disposed slots or openings 12 formed in the flanges of the corner post and preferably disposed one above the other for the reception of the adjacent ends of the horizontal braces 13. The braces 13 are arranged in pairs, a pair of said braces being preferably disposed at the ground line and another pair at the upper end of the post thereby to effectually reinforce and strengthen the corner of the fence and prevent sagging of the line wires. The line posts 5 adjacent the corner posts 10 are also provided with slots 14 which receive the ends of the adjacent braces 13 and serve to support the outer ends thereof, the inner ends of the braces being disposed in overlapped relation and projected through the slots 12 in the corner posts as before stated. The horizontal braces 13 are also preferably formed of angle iron, one of the flanges of each brace being projected longitudinally beyond the adjacent flange at the opposite ends of the brace to form extensions 15 for engagement with suitable wires 16. The wires 16 are tied around the extensions 15 at the line post 5 and are thence extended downwardly and inwardly to the lower portion of the corner post 10 where they are anchored in any suitable manner. Attention is here called to the fact that by extending the flanges of the braces 13 longitudinally shoulders 17 are produced, which bear against the adjacent flanges of both the line and the corner posts, and serve to limit the longitudinal movement of the horizontal braces and thus assist in rigidly binding the several parts. The angular flanges of the corner post 10 are formed with a vertical row of spaced openings or perforations 18 adapted to receive and anchor the adjacent ends of the longitudinal wires of the fence, the intermediate portions of the line wires being retained in position by engagement with the clips or tongues 7, as before stated.

If desired, the lower set of clips 7 of the line posts 5 may be utilized for anchoring a longitudinal brace strip 19, but under ordinary conditions, the clips will be employed for retaining the line wires in position on the adjacent fence posts. It will be noted that the extensions 15 not only form a means for tying the corner and frame post together but also form an anchorage for and with the diagonal braces 16, this construction enabling the post to withstand any strain to which it may be subjected, without likelihood of the post becoming displaced, or the wires constituting the fence becoming sagged. The post may be employed for supporting a single line of wires, or woven mesh wire, the latter being shown in the drawing by way of illustration.

Having thus described my invention, what I claim as new is:

1. In a wire fence, a corner post including a body portion having angularly disposed flanges provided with means for engagement with the adjacent line wires, there being a plurality of sets of openings formed in the flanges at the top and bottom of the post and disposed in staggered relation for the reception of braces, the lower wall of one of the openings of each set being disposed in horizontal alinement with the lower wall of the other opening of said set.

2. In a wire fence, a corner post having angularly disposed flanges formed with upper and lower sets of vertical slots, the slots of each set being arranged one above the other, line posts spaced from the corner post and also having angularly disposed flanges, one flange of each line post being formed with spaced vertical slots disposed in horizontal alinement with some of said slots in the corner post, upper and lower horizontal braces forming a connection between the line and corner posts and having their opposite ends provided with reduced extensions projecting through the adjacent slots in the line and corner posts, the inner ends of the braces at the reduced portions thereof bearing against the inner faces of the flanges of the corner post, and guy wires looped around the extensions of the braces at the line posts and connected with the lower portion of the corner post.

3. In a wire fence, a corner post having angularly disposed flanges, there being a plurality of sets of vertical slots formed in said flanges and disposed one above the other, one wall of each slot being formed by a portion of the adjacent flange, line posts spaced from the corner post and provided with flanges having similar vertical slots, upper and lower horizontal braces having reduced portions extending through the slots in the line and corner posts and provided with shoulders adapted to bear against the inner faces of the flanges at the adjacent slots, the inner ends of the horizontal braces intersecting at the corner post and having their outer faces arranged to bear against the adjacent inner faces of the flanges at said corner post, and guy wires, each having one end thereof looped around the line posts at the upper horizontal braces and their lower ends looped around the corner post at the lower horizontal braces.

In testimony whereof I affix my signature in presence of two witnesses.

SAMUEL F. WEBB. [L. S.]

Witnesses:
   M. T. GOFORTH,
   S. D. HUFF.